Feb. 8, 1966 W. HALPERN 3,233,260
APPARATUS FOR DEBURRING AND CHAMFERING IN COMBINATION
WITH DRILL OR REAMER OR THE LIKE
Original Filed April 12, 1961

INVENTOR.
William Halpern
BY
Curtis, Morris, & Safford
ATTORNEYS

United States Patent Office 3,233,260
Patented Feb. 8, 1966

3,233,260
APPARATUS FOR DEBURRING AND CHAMFERING IN COMBINATION WITH DRILL OR REAMER OR THE LIKE
William Halpern, Haviland Road, Harrison, N.Y.
Continuation of application Ser. No. 102,565, Apr. 12, 1961. This application Sept. 28, 1964, Ser. No. 403,430
1 Claim. (Cl. 10—140)

This invention relates to deburring tools and more in particular to apparatus for performing deburring operations simultaneously with tapping operations and the like, or as an adjunct thereto. This application is a continuation of my parent application, Serial No. 102,565, filed April 12, 1961, now abandoned.

An object of this invention is to provide improved means for removing burrs from holes. A further object is to provide improved deburring apparatus. A further object is to provide for the above in combination with apparatus for tapping holes. Another object is to provide improved deburring and tapping apparatus which performs the two functions as a single operation. A further object is to provide for the above with apparatus which is efficient, dependable, compact, and which is adaptable to various conditions of operation and use. A further object is to provide for the above with structure which has improved life, and which will withstand the normal and expected actions in use, as well as abuses, without excess wear or damage. These and other objects will be in part obvious, and in part pointed out below.

Figures 1, 2, 3:
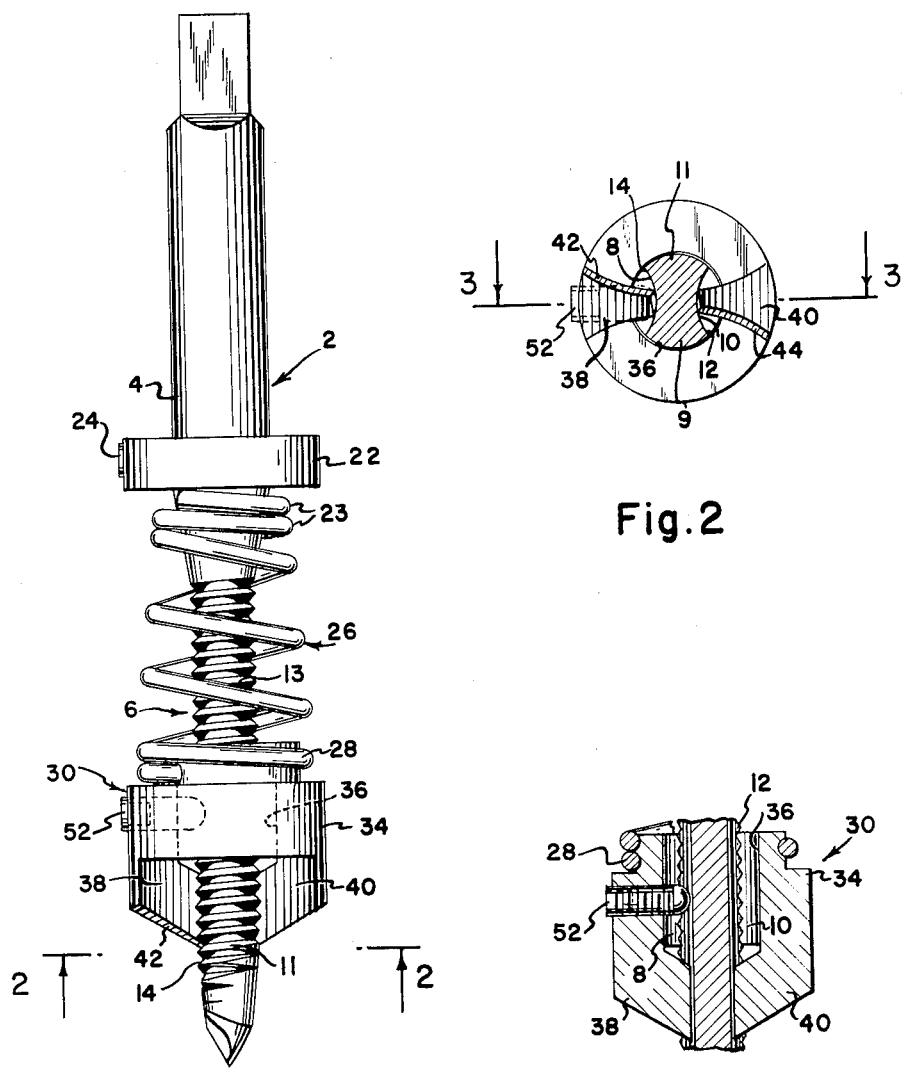
FIGURE 1 is a side elevation of one embodiment of the invention.
FIGURE 2 is a sectional view on the line 2—2 of FIGURE 1.
FIGURE 3 is a sectional view on the line 3—3 of FIGURE 2.

Referring to FIGURE 1 of the drawings, a tapping tool 2 has a shank 4, and a tapping tool body 6 with two longitudinal flutes 8 and 10 which are separated by longitudinal lands 9 and 11. The tapping tool body 6 has thread-cutting or tapping threads 13 which cut internal threads when the tool is rotated clockwise into a hole. The leading cutting edges 12 and 14 on the lands cut away the metal and form the threads in the workpiece.

Mounted upon the tool are: a collar 22 which is clamped to shank 4 by a set screw 24; a deburring and chamfering unit 30; and, a spiral spring 26, which is of special construction to be discussed below. Spring 26 is formed of round stock and has two full turns 23 at its upper end which snugly clamp shank 4 and also rest against collar 22, and the spring terminates at its lower end in a single turn 28 which nests in a groove in a collar upon the upper end of unit 30. Thus, spring 26 resiliently supports unit 30 from shank 4, but the unit may be moved longitudinally of the tool body by flexing the spring. Unit 30 has an upper body portion 34 with an internal bore 36, the diameter of which is greater than the maximum diameter of the threads on tools 2. Projecting downwardly from body portion 34 are two integral deburring and chamfering tool elements 38 and 40 which are identical, and which are positioned, respectively, in alignment with flutes 8 and 10. Elements 38 and 40 project into the respective flutes and terminate adjacent the bottom central surfaces of the flutes (see FIGURE 3), so that these elements project inwardly beyond the radius of the smallest diameter of the cutting edges 12 and 14 on lands 9 and 11. Elements 38 and 40 have cutting edges 42 and 44, respectively, each of which projects radially outwardly from adjacent the bottom of its flute to substantially beyond the maximum diameter of the holes to be tapped. A set screw 52 extends from unit 30 against the bottom of flute 8. Set screw has a round nose which rests in the bottom of the flute and may move longitudinally therealong, but it provides sufficient contact to turn unit 30 with tool 2.

As indicated above, tool 2 is rotated clockwise during the tapping operation. However, the cutting edges 42 and 44 are upon the trailing edges of elements 38 and 48 when unit 30 is turned clockwise with tool 2. Therefore, when element 30 moves into contact with the workpiece during the tapping of a hole by tool 2, the cutting edges ride upon the end of the hole, but they do not cut the workpiece because of their trailing relationship. The tool threads downwardly into the hole, and the resilient mounting of unit 30 by spring 26 permits the unit to slide upwardly with respect to the tool, with the spring being gradually compressed or "loaded."

When the tapping operation has been completed, the rotation of tool 2 is reversed so as to thread it out of the tapped hole. This reverse movement causes the cutting edges 44 to become effective, and they cut away the burr and produce a chamfer upon the upper end of the hole. The positioning of collar 22 and unit 30 upon tool 2 may be adjusted so as to change the amount of cutting produced by unit 30. At the start of the reverse turning of tool 2, spring 26 is under maximum tension and presses tool 30 against the workpiece with maximum force. This insures the desired heavy cutting action at the start of the deburring and chamfering operation. However, as the reverse rotation continues and tool 2 is gradually withdrawn from the hole, the pressure exerted by spring 20 upon unit 30 is reduced, and tool 30 produces a final finished cut or smooth surface on the chamfer. It has been indicated that the amount of chamfer may be increased by moving collar 22 inwardly upon the shank of tool 2, and that the amount of chamfer may be decreased by moving the collar upwardly. Furthermore, the positioning of the collar is changed, depending upon the depth of the tapping which is being performed in the hole.

Spring 26 is tapered between the minimum diameter at the top, and the maximum diameter at the bottom. This insures the desired resilient support for unit 30, and yet the length of spring is less than would be necessary for a spring of uniform diameter throughout. The tapered form of the spring permits greater singular deforming or twisting of the spring and, at the same time, the spring provides a balanced force which holds unit 30 in exact axial alignment with the tapping tool. This alignment is maintained even when the spring is compressed substantially. It has been found that this form of spring gives very improved results with different types of chamfering and deburring tools.

In the illustrative embodiment, the tapping tool is of the chamfered or starting-thread type, but it is understood that the invention is applicable to other types of tools.

As many possible embodiments may be made of the mechanical features of the above invention and as the art herein set forth might be varied in various parts, all without departing from the scope of the invention, it is to be understood that all matter hereinabove set forth, or shown in the accompanying drawings is to be interpreted as illustrative and not in a limiting sense.

I claim:

In apparatus of the character described, a combined tool comprising, a rotary tapping tool which has a shank and has flutes and adjacent cutting edges adapted to tap a hole when rotted therein in one direction and thereafter to be withdrawn by reverse rotation, a unit mounted upon said tapping tool and having a pair of radial cutting edges which extend respectively into said flutes and through a zone at the radius of the hole, a set screw threadably mounted in a radial hole in said unit and having a rounded nose which rests in the bottom of one of said flutes so as to provide for the rotation of said unit with the tool while permitting said unit to move longitudinally of the tool, said cutting edges constituting leading edges on said unit when said unit is rotated in said reverse direction, a tapered spiral spring which is formed of round stock and which is attached at its end of maximum diameter to said unit and has its end of minimum diameter positioned at the shank of the tool, collar means adjustably mounted upon said shank and providing an abutment for said spring end of minimum diameter performing a clamping action to thereby connect said spring to said shank, said unit being movable by the movement of said tool during the tapping of a hole to a position wherein said cutting edges project into the entry end of the hole with the cutting edges being trailing edges of the unit, said spring maintaining its resiliency by virtue of its taper when compressed axially, so that said unit is held resiliently by said spring against said entry end of the hole during the entire tapping movement of the tool and during the initial reverse rotation of the tool whereby said cutting edges are effective to deburr and chamfer said entry end of the hole.

References Cited by the Examiner
UNITED STATES PATENTS 202,019   4/1878   Gray _____ 267—62

FOREIGN PATENTS 19,943   12/1892   Great Britain.

OTHER REFERENCES

"Automatic Machining," burr bit article, July 1956, page 78.

ANDREW R. JUHASZ, *Primary Examiner.*